United States Patent
Kim et al.

(10) Patent No.: US 12,555,838 B2
(45) Date of Patent: Feb. 17, 2026

(54) METHOD FOR REUSING ACTIVE MATERIAL BY USING POSITIVE ELECTRODE SCRAP

(71) Applicant: LG ENERGY SOLUTION, LTD., Seoul (KR)

(72) Inventors: Min-Seo Kim, Daejeon (KR); Se-Ho Park, Daejeon (KR); Doo-Kyung Yang, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 709 days.

(21) Appl. No.: 17/924,313

(22) PCT Filed: Aug. 30, 2021

(86) PCT No.: PCT/KR2021/011630
§ 371 (c)(1),
(2) Date: Nov. 9, 2022

(87) PCT Pub. No.: WO2022/065721
PCT Pub. Date: Mar. 31, 2022

(65) Prior Publication Data
US 2023/0238598 A1    Jul. 27, 2023

(30) Foreign Application Priority Data
Sep. 28, 2020   (KR) .................. 10-2020-0125730

(51) Int. Cl.
H01M 10/54   (2006.01)
C01G 51/42   (2025.01)
(Continued)

(52) U.S. Cl.
CPC ............ H01M 10/54 (2013.01); C01G 51/42 (2013.01); C01G 53/50 (2013.01); C22B 1/005 (2013.01);
(Continued)

(58) Field of Classification Search
CPC .................................................. H01M 10/54
See application file for complete search history.

(56) References Cited

U.S. PATENT DOCUMENTS

2012/0068107 A1   3/2012   Chung et al.
2014/0056797 A1   2/2014   Kabe et al.
(Continued)

FOREIGN PATENT DOCUMENTS

CN   106688135 A   5/2017
CN   110265742 A   9/2019
(Continued)

OTHER PUBLICATIONS

Sieber Tim et al., Recover of Li(Ni0.33Mn0.33Co0,33)O2 from Lithium-Ion battery cathode: Aspects of Degradation, Feb. 12, 2019, p. 246, XP93054531.

*Primary Examiner* — Peter F Godenschwager
(74) *Attorney, Agent, or Firm* — Bryan Cave Leighton Paisner LLP

(57) ABSTRACT

A method for reusing a positive electrode active material includes dry-milling a positive electrode scrap comprising an active material layer on a current collector to convert the active material layer into a powdered state and to separate the active material layer from the current collector. The active material layer is a lithium composite transition metal oxide positive material active material layer. The method further includes adding a lithium precursor to a the active material layer. The method further includes thermally treating the active material layer in the powdered state to collect an active material. The method further includes obtaining a reusable active material by washing the collected active material with a basic lithium compound aqueous solution and drying the collected active material.

12 Claims, 4 Drawing Sheets

(51) Int. Cl.
*C01G 53/50* (2025.01)
*C22B 1/00* (2006.01)
*C22B 7/00* (2006.01)

(52) U.S. Cl.
CPC .......... *C22B 7/001* (2013.01); *C01P 2002/52* (2013.01); *C01P 2004/03* (2013.01); *C01P 2006/40* (2013.01); *C01P 2006/80* (2013.01)

(56) References Cited

U.S. PATENT DOCUMENTS

| | | |
|---|---|---|
| 2016/0043450 A1 | 2/2016 | Sloop |
| 2017/0200989 A1 | 7/2017 | Sloop |
| 2018/0212282 A1 | 7/2018 | Lee et al. |
| 2023/0183836 A1 | 6/2023 | Kim et al. |

FOREIGN PATENT DOCUMENTS

| | | |
|---|---|---|
| CN | 110797602 A | 2/2020 |
| CN | 110842006 A | 2/2020 |
| CN | 115210936 A | 10/2022 |
| IT | VI20100232 A1 | 2/2012 |
| JP | 2012-195073 A | 10/2012 |
| JP | 5245538 B2 | 7/2013 |
| JP | 2013211234 A | 10/2013 |
| JP | 6055761 B2 | 12/2016 |
| KR | 10-2000-0019850 A | 4/2000 |
| KR | 10-10499370000 B1 | 7/2011 |
| KR | 10-11911540000 B1 | 10/2012 |
| KR | 10-13598660000 B1 | 1/2014 |
| KR | 10-20170033787 B1 | 3/2017 |
| KR | 10-1792753000 B1 | 10/2017 |
| KR | 10-2018-0071106 A | 6/2018 |
| KR | 10-2018-0100414 A | 9/2018 |
| KR | 10-19927150000 B1 | 6/2019 |
| KR | 10-2020-0066265 A | 6/2020 |

METHOD FOR REUSING ACTIVE MATERIAL BY USING POSITIVE ELECTRODE SCRAP

CROSS-REFERENCE TO RELATED APPLICATION(S)

This is a National Phase entry pursuant to 35 U.S.C. 371 of International Application No. PCT/KR2021/011630 filed on Aug. 30, 2021, and claims priority to and the benefit of Korean Patent Application No. 10-2020-0125730 filed on Sep. 28, 2020 with the Korean Intellectual Property Office, the disclosure of which is incorporated herein by reference in its entirety.

TECHNICAL FIELD

The present disclosure relates to a method for reusing resources in the fabrication of a lithium secondary battery. More particularly, the present disclosure relates to a method for collecting and reusing a positive electrode scrap generated in the lithium secondary battery fabrication process or positive electrode active materials of lithium secondary batteries discarded after use.

BACKGROUND

Lithium secondary batteries that can be recharged repeatedly are gaining attention as an alternative to fossil energy. They have been primarily used in traditional handheld devices such as mobile phones, video cameras and electric power tools. Recently, the range of applications tends to gradually extend to vehicles which are powered by electricity (EVs, HEVs, PHEVs), large-capacity energy storage systems (ESSs) and uninterruptible power systems (UPSs).

A lithium secondary battery includes an electrode assembly including unit cells, each unit cell including a positive electrode plate and a negative electrode plate including a current collector and an active material coated on the current collector with a separator interposed between the positive electrode plate and the negative electrode plate, and a packaging or a battery case in which the electrode assembly is hermetically received together with an electrolyte solution. The lithium secondary battery primarily includes lithium-based oxide as the positive electrode active material and a carbon-based material as the negative electrode active material. The lithium-based oxide contains a metal such as cobalt, nickel or manganese. In particular, cobalt, nickel and manganese are very expensive invaluable metals. Among them, cobalt is a strategic metal, and its supply is the focus of attention all over the world. Due to the limited number of cobalt producing countries, the global supply of cobalt is unstable. When a supply and demand imbalance of strategic metal occurs, there is a very high possibility that the cost of the raw material will rise.

Studies have been made to collect and recycle invaluable metals from lithium secondary batteries (waste batteries) discarded after the expiration date. In addition to waste batteries, resources may be more preferably collected from waste materials discarded after punching the positive electrode plate or the positive electrode in which defects or failures occurred during the process.

Currently, the lithium secondary battery is fabricated, as shown in FIG. 1, by coating a positive electrode slurry including a positive electrode active material, a conductive material, a binder and a solvent on a long sheet-type positive electrode current collector 10 such as an aluminum (Al) foil to form a positive electrode active material layer 20, manufacturing a positive electrode sheet 30, and punching a positive electrode plate 40 to a predetermined size. The leftover after punching is discarded as a positive electrode scrap 50. If the positive electrode active material is collected and reused from the positive electrode scrap 50, it will be very desirable in the industrial-economic and environmental aspects.

Most of the existing methods of collecting the positive electrode active material include dissolving the positive electrode with hydrochloric acid, sulfuric acid, nitric acid or the like, extracting the active material elements such as cobalt, nickel and manganese and using them as raw materials for the positive electrode active material synthesis. However, the active material element extraction using acids uses a non-eco-friendly process to collect pure raw materials, and needs a neutralization process and a waste water treatment process, resulting in the increased process cost. Additionally, it is impossible to collect lithium, one of the key positive electrode active material elements. To overcome these disadvantages, there is a need for a direct reuse method that does not dissolve the positive electrode active material and does not extract the active material in the form of an element.

SUMMARY

The present disclosure is directed to providing a method for collecting and reusing an active material from a positive electrode scrap.

To solve the above-described problem, a method for reusing a positive electrode active material according to the present disclosure includes (a) dry-milling a positive electrode scrap comprising a lithium composite transition metal oxide positive electrode active material layer on a current collector to bring the active material layer into a powdered state and separate from the current collector, (b) thermally treating the active material layer in powder form in air after addition of a lithium precursor for overcoating or doping of lithium from the lithium precursor on a surface of the active material layer and thermal decomposition of a binder and a conductive material in the active material layer, to collect an active material, and (c) washing the collected active material with a lithium compound solution which is basic in an aqueous solution and drying to obtain a reusable active material.

In the present disclosure, the method for reusing a positive electrode active material may further include (d) surface-coating the dried active material.

The dry-milling may use any one of a pin mill, a disc mill, a cutting mill and a hammer mill.

Before the dry-milling, the method may further include shredding or cutting the positive electrode scrap.

The thermal treatment may be performed at 300 to 1000° C.

The thermal treatment may be performed at 550° C. for 30 minutes at a temperature rise rate of 5° C./min.

The lithium compound solution contains a lithium precursor, preferably LiOH, in an amount of more than 0% and 15% or less. The washing may be performed for 1 hour or less.

The washing may be performed by stirring the collected active material at the same time with immersing in the lithium compound solution.

The lithium precursor may be at least one of LiOH, $Li_2CO_3$, $LiNO_3$ or $Li_2O$.

The lithium precursor may be added in an amount for adding lithium at a ratio of lost lithium to a ratio between lithium and other metal in a raw active material used in the active material layer.

For example, the lithium precursor may be added in an amount for adding lithium at a molar ratio of 0.001 to 0.4.

Further, the lithium precursor is preferably added in an amount for adding more lithium at a molar ratio of 0.0001 to 0.1 based on a 1:1 molar ratio of lithium:other metal.

A temperature of the annealing step may exceed a melting point of the lithium precursor.

The active material in the active material layer may be collected in powder form, and carbon produced by carbonization of the binder or the conductive material may not remain on a surface.

The surface-coating step may include coating at least one of a metal, an organic metal or a carbon material on the surface by a solid or liquid phase process, and thermally treating at 100 to 1200° C.

The reusable active material may be represented by the following Formula 1:

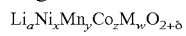
[Formula 1]

where M comprises at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, $x+y+z+w=1$.

The reusable active material may have a fluorine (F) content of 100 ppm or less.

According to the present disclosure, it is possible to reuse waste positive electrode active materials such as positive electrode scrap generated in the lithium secondary battery fabrication process without using acids, thereby achieving eco-friendliness. The method according to the present disclosure does not need a neutralization process or a waste water treatment process, thereby achieving environmental mitigation and process cost reduction.

According to the present disclosure, it is possible to collect all the metal elements of the positive electrode active materials. It is possible to collect the current collector since it does not dissolve the current collector. This method does not use the extracted active material elements as raw materials for positive electrode active material synthesis, and instead directly reuses the active materials collected in powder form, thereby achieving economic efficiency.

According to the present disclosure, toxic and explosive solvents such as NMP, DMC, acetone and methanol are not used, thereby achieving safety, and since simple processes such as thermal treatment, washing and annealing are used, it is easy to manage the process and suitable for mass production.

According to the present disclosure, it is possible to ensure excellent resistance characteristics and capacity characteristics without electrochemical performance degradation of the collected active materials.

In particular, according to the present disclosure, first, the active material is separated from the current collector using dry-milling. It is possible to achieve the positive electrode active material collection of 95% or more by perfectly separating the active material from the current collector by dry-milling. Additionally, thermal treatment is performed after the addition of a lithium precursor. Through this, it is possible to reduce HF gas produced during thermal decomposition of the binder and suppress lithium losses in the active material.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus the present disclosure should not be construed as being limited to the drawings.

DETAILED DESCRIPTION

Figure 1:
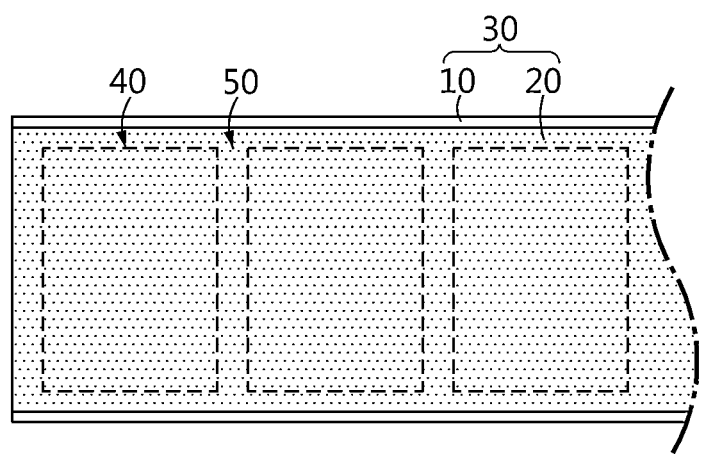
FIG. 1 is a diagram showing a positive electrode scrap discarded after punching a positive electrode plate in a positive electrode sheet.

Hereinafter, the embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an embodiment of the present disclosure, and do not fully describe the technical aspect of the present disclosure, so it should be understood that a variety of other equivalents and modifications could have been made thereto at the time of filing the patent application.

In the following description, a reference is made to the accompanying drawings that make up some of the present disclosure. The embodiments described in the detailed description, the drawings and the appended claims are not intended to be limiting. Other embodiments may be used without departing from the technical aspect and scope of the subject matter disclosed herein, and modifications and changes may be made thereto. As commonly described herein and illustrated in the drawings, the aspects of the present disclosure may include arrangement, substitution, combination, separation and design of a variety of different elements, and it will be immediately understood that all of them are clearly taken into account.

Unless otherwise defined, all terms (including technical and scientific terms) used herein have the same meaning as commonly understood by those having ordinary skill in the technical field pertaining to the present disclosure (hereinafter those skilled in the art).

The present disclosure is not limited to specific embodiments described herein. As obvious to those skilled in the art, many modifications and changes may be made thereto without departing from the technical aspects and scope of the present disclosure. In addition to those enumerated herein, functionally equivalent methods in the scope of the present disclosure will be obvious to those skilled in the art from the previous descriptions. Such modifications and changes fall in the scope of the appended claims. The present disclosure will be defined by the appended claims along with the full scope of equivalents to which the appended claims are entitled. It should be understood that the present disclosure is not limited to specific variant methods. It should be further understood that the terms used herein are for the purpose of describing the specific embodiments, but not intended to limit the present disclosure.

The conventional process for reusing an active material is mainly aimed at extracting the elements of invaluable metals (nickel, cobalt, manganese) in active materials of lithium secondary batteries of which the performance degraded after use and re-synthesizing the active materials, and as opposed to the conventional process, the present disclosure is characterized as collecting an active material from a positive electrode scrap generated in the lithium secondary battery fabrication process.

In addition, the well-known process for reusing an active material involves producing metals (direct reduction method) or resynthesized active materials from invaluable metals extracted through acid/base dissolution or melting using reduction agents/additives, which requires an additional chemical method, making the process complex and causing additional economical expenses. However, the present disclosure relates to a method for reusing a positive electrode active material directly without dissolving the positive electrode active material.

To directly reuse the positive electrode active material, it is necessary to remove the current collector from the positive electrode. The current collector may be removed from the positive electrode by removing the binder through high temperature thermal treatment, melting the binder using the solvent, melting the current collector, and screening the active material through dry-milling and sieving.

When melting the binder using the solvent, the stability of the solvent is important. NMP is the most efficient solvent, but its disadvantage is toxicity and high cost. Another disadvantage is that a waste solvent re-treatment or solvent collection process is necessary. The melting of the current collector requires a lower process cost than using the solvent. However, it is difficult to remove impurities from the reusable active material surface, and hydrogen gas is produced in the current collector removal process, causing an explosion risk. Dry-milling and sieving cannot perfectly separate the active material from the current collector. The particle size distribution of the active material changes in the milling process and it is difficult to remove the binder, resulting in characteristics degradation of batteries including the reusable active materials.

The present disclosure separates the active material from the current collector using dry-milling. It is possible to achieve the positive electrode active material collection of 95% or more by perfectly separating the active material from the current collector by dry-milling. Subsequently, the binder and the conductive material are removed through thermal treatment. Since thermal treatment is performed in air, the process only requires heating without any special device configuration and thus is relatively simple, and it is suitable for mass production and commercialization. However, it is necessary to avoid impurities remaining on the reusable active material surface. The present disclosure proposes removing impurities from the reusable active material surface.

Figure 2:
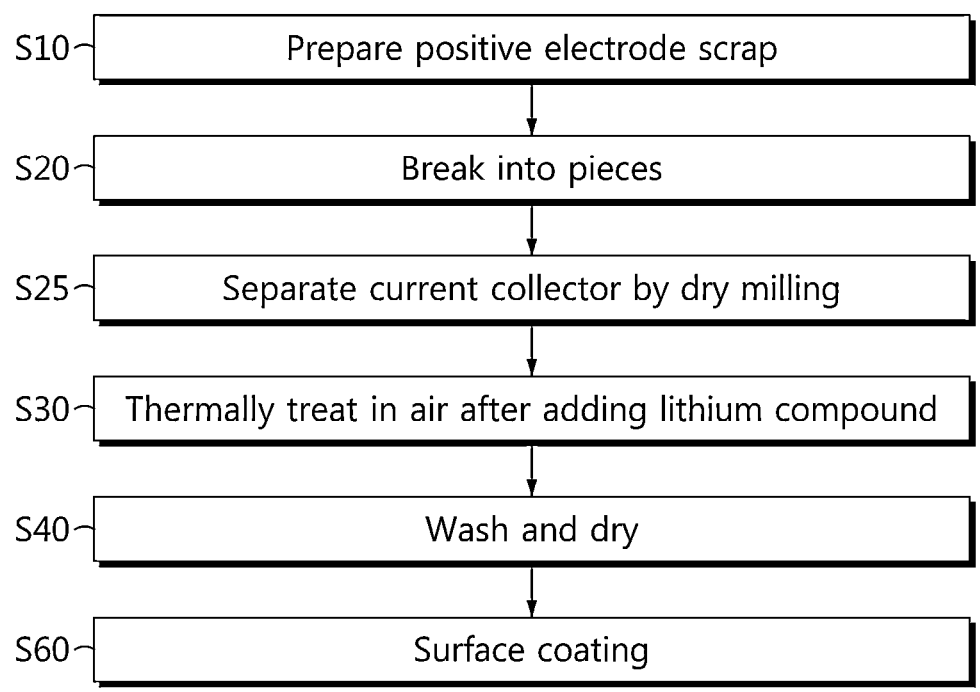
FIG. 2 is a flowchart of a method for reusing an active material according to the present disclosure.

Hereinafter, the method for reusing an active material according to an embodiment of the present disclosure will be described with reference to FIG. 2. FIG. 2 is a flowchart of the method for reusing an active material according to the present disclosure.

Referring to FIG. 2, first, a waste positive electrode scrap is prepared (s10).

As described above with reference to FIG. 1, the positive electrode scrap may be left over after manufacturing a positive electrode sheet including a positive electrode active material layer on a current collector and punching the positive electrode sheet. In addition, the positive electrode scrap may be prepared by collecting positive electrodes in which defects or failures occurred during the process. Additionally, the positive electrode scrap may be prepared by separating positive electrodes from lithium secondary batteries discarded after use.

For example, the positive electrode scrap may be the leftover after coating a slurry on a sheet type current collector of an aluminum foil, the slurry prepared by mixing a lithium cobalt oxide active material such as $LiCoO_2$(LCO) or NCM active material comprising nickel, cobalt and manganese, a carbon-based material, for example, carbon black as a conductive material and polyvinylidene fluoride (PVdF) as a binder in N-methyl pyrrolidone (NMP), then drying in a vacuum oven of about 120° C. to manufacture a positive electrode sheet, and punching the positive electrode plate into a predetermined size.

The positive electrode active material of lithium secondary batteries includes lithium composite transition metal oxide, and in particular, lithium cobalt oxide such as $LiCoO_2$, lithium manganese oxide ($LiMnO_2$ or $LiMn_2O_4$), lithium iron phosphate compounds ($LiFePO_4$) or lithium nickel oxide ($LiNiO_2$). Additionally, to improve low thermal stability while maintaining excellent reversible capacity of $LiNiO_2$, nickel manganese-based lithium composite metal oxide with partial substitution of manganese (Mn) having excellent thermal stability for nickel (Ni) and NCM lithium composite transition metal oxide substituted with manganese (Mn) and cobalt (Co) are used. In particular, the present disclosure is suitable for the reuse of LCO or NCM active materials.

The positive electrode scrap has the active material layer on the current collector of the metal foil such as the aluminum foil. The active material layer is formed by coating the slurry including the mixture of the active material, the conductive material, the binder and the solvent, and after solvent volatilization, the active material and the conductive material are bonded by the binder. Accordingly, when the binder is removed, the active material may be separated from the current collector.

Subsequently, the positive electrode scrap is broken into pieces to a proper size (s20). Breaking into pieces refers to shredding of the positive electrode scrap into pieces to a proper size for handling. After shredding, the positive electrode scrap has the size of about 10 cm×10 cm. In addition, cutting may be performed to cut to a smaller size. When cutting, the size of the positive electrode scrap is reduced to, for example, 1 cm×1 cm.

The breaking into pieces including shredding and cutting may be performed considering the handling of the positive electrode scrap and the characteristics required in equipment used in the subsequent processes. For example, when equipment requiring continuous treatment in the loading and unloading of the positive electrode scrap is used, it is necessary to break too large positive electrode scrap into pieces to facilitate the movement of the positive electrode scrap.

Subsequently, the positive electrode scrap broken into pieces is dry-milled to bring the active material layer into a powdered state and separate it from the current collector (s25). The dry-milling may use any one of a pin mill, a disc mill, a cutting mill and a hammer mill, and preferably a pin mill. It is possible to achieve 95% or more collection of the positive electrode active material in powder form of 5 mm or less by the pin mill.

The pin mill is a device having a structure in which rotor pins and stator pins are engaged with each other, and when a raw material is fed into the mill, the raw material is dispersed with a flow of air by rotation and milled using brittleness of the raw material by the impact of the rotor and the stator. The milled product is allowed to pass through openings in a screen formed in the shape of a ring, and only a portion of the milled product having passed through is taken.

Using the pin mill, it is possible to mill at a desired level and a desired particle size by adjusting the type and number of pins and the size range of the screen for sieving. When the positive electrode scrap broken into pieces is milled using the pin mill, the current collector piece is cut to a smaller size, and the highly brittle active material layer is separated from the current collector piece. The highly flexible current collector piece is rolled into a round shape and remains in the screen, and only the active material layer in fine powder form having passed through the screen may be separately obtained. The active material layer loses its continuity that makes it called as a layer and is broken into pieces, but still the active material, the binder and the conductive material gather together in powder form. The active material layer and the current collector may be separated by dry-milling through the differences in brittleness and flexibility of the active material layer and the current collector.

Subsequently, the active material layer in powder form is thermally treated in air after the addition of a lithium precursor (s30).

The lithium precursor may be at least one of LiOH, $Li_2CO_3$, $LiNO_3$ or $Li_2O$. To add the lithium precursor, coating, dipping and spraying may be used. For example, the lithium precursor in liquid phase may be applied on the active material layer in powder form by spraying. For the lithium precursor in solid phase, powder mixing may be used.

In the present disclosure, the thermal treatment is performed for thermal decomposition of the binder and the conductive material in the active material layer. The thermal treatment may be performed at 300 to 1000° C., and may be referred to as high temperature thermal treatment. The temperature is subject to change within the limited range depending on the type of the lithium precursor. For example, when $Li_2CO_3$ is used as the lithium precursor, the annealing temperature is preferably 700-900° C., and more preferably 710-780° C. This is because the melting point of $Li_2CO_3$ is 723° C. Most preferably, the annealing is performed at 750° C. When LiOH is used as the lithium precursor, the annealing temperature is preferably 400-600° C., and more preferably 450-480° C. This is because the melting point of LiOH is 462° C.

Preferably, the annealing temperature is higher than the melting point of the lithium precursor. However, at higher temperatures than 1000° C., thermal decomposition of the positive electrode active material occurs and degrades the performance of the active material, and accordingly the annealing temperature does not exceed 1000° C. At temperatures of less than 300° C., it is difficult to remove the binder, thereby failing to separate the current collector. When the thermal treatment is performed in the presence of the current collector, it is necessary to perform the thermal treatment below the melting point of the current collector, but in the present disclosure, since the current collector has been already separated, there is no limitation by the current collector on the subsequent thermal treatment temperature.

The thermal treatment time is long enough for thermal decomposition of the binder. For example, the thermal treatment time is about 30 minutes. Preferably, the thermal treatment time is 30 minutes or longer. As the thermal treatment time increases, the thermal decomposition of the binder is prolonged, but when the thermal treatment time is equal to or longer than a predetermined time, there is no difference in thermal decomposition effect. Preferably, the thermal treatment time is 30 minutes or longer and 5 hours or shorter.

The thermal treatment equipment may include various types of furnaces. For example, the thermal treatment equipment may be a box type furnace, and when considering productivity, may be a rotary kiln capable of continuous treatment.

The thermal treatment may be followed by fast or slow cooling in air.

For example, the thermal treatment may be performed at 550° C. for 30 minutes at the temperature rise rate of 5° C./min. For example, the temperature rise rate is within the allowable range of the box type furnace and is enough to heat the powdery active material without thermal shock. 550° C. is good for thermal decomposition of the binder. When the thermal treatment is performed at the above-described temperature for less than 10 minutes, thermal decomposition is insufficient, and thus it is necessary to perform the thermal treatment for 10 minutes or longer, and preferably for 30 minutes or longer.

The binder and the conductive material in the active material layer undergo thermal decomposition through the thermal treatment in air into $CO_2$ and $H_2O$ which are removed. Since the binder is removed, the active material to collect may be deagglomerated and screened in powder form.

It is important to perform the thermal treatment of s30 in air. When the thermal treatment is performed in a reducing or inert gas atmosphere, the binder and the conductive material suffer carbonization rather than thermal decomposition. When carbonized, carbon remains on the active material surface and degrades the performance of the reusable active material. When the thermal treatment is performed in air, carbon in the binder or the conductive material is removed by combustion reaction with oxygen to produce CO, $CO_2$ gas, and thus the binder and the conductive material do not remain and are almost removed.

Accordingly, according to the present disclosure, the active material is collected in powder form, and carbon produced by the carbonization of the binder or the conductive material may not remain on the surface.

In particular, the thermal treatment step is characterized in that the thermal treatment of s30 is performed after the addition of the lithium precursor. The binder is usually pVdF. The decomposition of the PVdF binder produces a fluorine (F) based compound gas. The present disclosure performs the thermal treatment after the addition of the lithium precursor to reduce the production of the F based compound gas.

Specifically, when PVdF decomposes by high temperature heat, F in PVdF reacts with H to produce HF gas. The HF gas is filtered out by a capturing device, but it corrodes the device and the lifespan of the device may be shortened, and since it is harmful to human body, it is very important to reduce the production. The present disclosure adds the lithium precursor to increase the conversion to LiF rather than suppressing HF produced during the thermal treatment process. By the addition of the lithium precursor, the surface of the active material layer in powder form may be over-coated or doped with lithium from the lithium precursor. By the reaction between F which decomposes by the thermal treatment with the addition of the lithium precursor and Li in the added lithium precursor, the amount of HF decreases and LiF production increases, thereby reducing HF gas production.

Meanwhile, when PVdF decomposes by high temperature heat, some of F in PVdF reacts with lithium in the active material to produce LiF. In the present disclosure, the added lithium precursor reacts with F rather than lithium in the active material and suppresses the reaction with Li ions in the positive electrode active material, thereby securing the amount of residual lithium. That is, it is possible to reduce HF gas production and suppress lithium losses in the active material by the addition of the lithium precursor.

Since the melting point of LiOH is 462° C., when the thermal treatment is performed at about 550° C., liquid phase reaction occurs. LiOH reacts with HF to produce LiF and $H_2O$. In the presence of LiOH, HF reacts with LiOH earlier than Li of the active material, thereby preventing the losses of Li in the active material.

The thermal treatment makes it possible to collect the active material by the thermal decomposition of the binder and the conductive material in the active material layer in powder form, and in case that the crystal structure of the active material is damaged, recover the crystal structure, thereby obtaining the annealing effect of recovering or improving the properties of the reusable active material to the fresh active material level.

The lithium precursor is added in an amount for adding lithium at a ratio of lithium lost while being used or handled or lost in the previous process or to be lost in the subsequent process to a ratio between lithium and other metal in the raw active material (i.e., fresh active material) used in the active material layer. For example, when the ratio between lithium and other metal in the fresh active material is 1, the lithium precursor may be added in an amount for adding lithium at the molar ratio of 0.001 to 0.4. It is proper to add lithium at the molar ratio of 0.01 to 0.2. The addition of the lithium precursor exceeding lithium to be lost through washing causes unreacted lithium precursors to be left on the reusable active material, resulting in the increased resistance in the process of reusing the active material, and accordingly it is necessary to feed the lithium precursor in an optimal amount.

Additionally, the lithium precursor is preferably added in an amount for adding more lithium at the molar ratio of 0.0001 to 0.1 based on a 1:1 molar ratio of lithium:other metal. The addition of excess lithium is for forming a surface protection layer on the collected active material by the subsequent surface-coating, and it will be described in more detail below. When secondary batteries are manufactured using the active material, it is possible to suppress the side reactions by the electrolyte solution and maintain the life characteristics.

Subsequently, the collected active material is washed and dried (s40). It is important to wash with a lithium compound solution which is basic in an aqueous solution. The lithium compound solution contains a lithium precursor, preferably LiOH, in an amount of more than 0% and 15% or less. Preferably, the amount of LiOH is 15% or less. When LiOH is included in an excessive amount, excess LiOH may remain on the active material surface after washing, which may affect the subsequent annealing process. The addition of excess LiOH is not good for the process to make the active material surface before annealing as clean as possible, and accordingly the amount of LiOH is limited to 15% or less.

The washing may be performed by immersing the collected active material in the lithium compound solution. The washing may be performed for 1 week or less, preferably 1 day or less, and more preferably 1 hour or less, after immersion. When washing is performed for a week or longer, the capacity may reduce due to excessive lithium dissolution. Accordingly, it is desirable to wash for 1 hour or less. The washing includes immersing the active material in the lithium compound solution which is basic in an aqueous solution, and stirring in the immersed state. It is desirable to perform immersion and stirring together. When the active material is immersed in the lithium compound solution without stirring, the washing process is slow, resulting in lithium dissolution. When stirring is performed together, the process time is minimized, and accordingly it is desirable to stir at the same time with immersing in the lithium compound solution. The drying may be performed in air in a (convection type) oven after filtration.

The washing with the lithium compound solution which is basic in an aqueous solution may be performed for removal of LiF and metal fluoride present on the surface of the collected active material and surface modification. During the thermal treatment of s30, the binder and the conductive material in the active material layer are removed by evaporation of $CO_2$ and $H_2O$, and in this process, $CO_2$ and $H_2O$ react with lithium on the active material surface to produce $Li_2CO_3$, LiOH, and F present in the binder such as PVdF reacts with lithium or any other metal in the positive electrode active material and lithium in the added lithium precursor to produce LiF or metal fluoride. When LiF or metal fluoride remains, the characteristics of batteries including the reusable active material degrade. The present disclosure adds the washing step of s40, to remove reactants generated on the reusable active material surface during the thermal treatment step (s30), in order to prevent impurities from remaining on the reusable active material surface.

Since the present disclosure increases the conversion to LiF in the previous thermal treatment step, the active material surface after the thermal treatment has the increased LiF, but the increased LiF can be sufficiently removed from the active material through washing in the subsequent washing process.

In s40, it is important to wash with the lithium compound solution which is basic in an aqueous solution. When a sulfuric acid or hydrochloric acid aqueous solution is used instead of the lithium compound solution which is basic in an aqueous solution, F on the active material surface is washed out, but the performance of the reusable positive electrode active material may degrade due to dissolution of transition metal (Co, Mg) present in the active material. The lithium compound solution which is basic in an aqueous solution used in the present disclosure plays a role in removing trace amounts of binder that may be left after the thermal decomposition of s30, does not dissolve the transition metal present in the active material, and compensates for the amount of lithium that may be dissolved in the washing process.

LiF may act as a resistive layer when it remains. Through s40, the present disclosure may adjust the LiF content on the collected active material surface to less than 500 ppm, thereby improving the capacity. Preferably, the F content may be 100 ppm or less. More preferably, the F content may be 30 ppm or less.

The present disclosure is characterized in separating the active material in powder form from the current collector in the positive electrode scrap through dry-milling in s25. Due to the mechanical separation, there is no change in chemical properties of the current collector or the active material. Additionally, the present disclosure is characterized in performing the thermal treatment after the addition of the lithium precursor in s30. Through this, it is possible to increase LiF production and reduce the production of the F based gas compound (for example, HF) as described above. In particular, F reacts with lithium in the added lithium precursor to produce LiF, rather than taking the lithium source by reaction with lithium ions in the active material, thereby reducing the ratio of lithium remaining in the active material. When performing the thermal treatment, since the current collector has been already separated, the thermal treatment temperature for thermal decomposition of the binder and the conductive material can be adjusted from low temperature to high temperature, and it is available from LiOH having the melting point of 460° C. to $Li_2CO_3$ having the melting point of 723° C.

The reusable active material may be obtained through the above-described step s40.

Optionally, s60 may be performed. In s60, surface-coating is performed on the active material dried in s40.

The surface-coating step may include coating at least one of a metal, an organic metal or a carbon material on the surface by a solid or liquid phase process and thermally treating at 100 to 1200° C. When the thermal treatment is performed at higher temperatures than 1200° C., performance degradation may occur due to thermal decomposition of the positive electrode active material. In the surface-coating, coating on the surface by a solid or liquid phase process may use mixing, milling, spray drying and grinding.

Through the surface-coating, a surface protection layer of different metals is formed. In case that the molar ratio of lithium:other metal in the positive electrode active material is 1:1, when the molar ratio of lithium:other metal in the positive electrode active material reduces to less than 1:1 by the reaction of lithium in the active material with the surface coating material, it fails to exhibit the capacity 100%. Accordingly, lithium is added through the addition of the lithium precursor in the previous step s30 so that the molar ratio of lithium:other metal in the positive electrode active material is 1:1, and besides, more lithium in an excessive amount is added at the molar ratio of 0.0001 to 0.1 to other metal in the positive electrode active material. Accordingly, it is possible to form the surface protection layer at the 1:1 molar ratio of lithium:other metal in the positive electrode active material in the surface-coating.

In detail, when the active material is coated with metal oxide such as B, W, B—W and thermally treated, a lithium boron oxide layer may be formed on the active material surface, and this serves as the surface protection layer. The lithium additionally included at the molar ratio of 0.0001 to 0.1 in s50 reacts with the metal oxide such as B, W, B—W in s60, and the molar ratio of lithium:other metal in the positive electrode active material does not reduce to less than 1:1, so there is no capacity reduction.

The reusable active material obtained by the above-described method may be represented by Formula 1.

   [Formula 1]

where M comprises at least one selected from the group consisting of B, W, Al, Ti and Mg, $1<a\leq1.1$, $0\leq x<0.95$, $0\leq y<0.8$, $0\leq z<1.0$, $0\leq w\leq0.1$, $-0.02\leq\delta\leq0.02$, $x+y+z+w=1$.

The reusable active material may have the F content of 100 ppm or less. According to the present disclosure, it is possible to collect the active material having the reduced F content, and provide excellent resistance characteristics and capacity characteristics when reused as active materials.

According to the present disclosure, the addition of the lithium precursor in the thermal treatment step of s30 reduces HF gas produced during the thermal decomposition of the binder and suppress lithium losses in the active material. Additionally, LiF or metal fluoride produced with increased conversion in s30 is removed in the washing step of s40. The step of washing using the lithium compound solution which is basic in an aqueous solution and drying is safe and low-priced, and may remove LiF or metal fluoride without losses of other elements, prevent the dissolution of transition metal, and compensate for the lithium loss occurring during the process. The annealing step is also safe and low-priced and may recover the crystal structure, i.e., improve the crystallinity, thereby enhancing the battery characteristics of the reusable active material.

The reusable active material obtained according to the present disclosure may have a similar particle size distribution to fresh active materials, thereby eliminating the need for any treatment to control the particle size distribution. Since carbon produced by carbonization of the binder or the conductive material does not remain on the surface, there is no need for a carbon removal step. Accordingly, the active material obtained through the method of FIG. 2 may be used to manufacture the positive electrode without any treatment.

The reusable active material may be used 100% without composition adjustment or mixed with fresh active materials, and may be used to prepare a slurry in combination with a conductive material, a binder and a solvent.

Hereinafter, the experimental example of the present disclosure will be described in detail.

Experimental Example 1

A positive electrode scrap using NCM lithium composite transition metal oxide positive electrode active material and a positive electrode scrap using LCO active material are prepared. The active material in powder form is separated by the dry-milling step according to the present disclosure, and simply thermally treated at 550° C. for 30 minutes without lithium precursor addition according to the present disclosure. Subsequently, some is immersed in LiOH aqueous solution for 10 minutes to wash according to the present disclosure, and others are not washed. To determine the Li/metal mole ratio and the residual LiF content in the active material, residual F content analysis is performed, and the results are summarized in Table 1.

Comparative example 1 is LCO fresh active material. Comparative example 2 is LCO positive electrode scrap having undergone thermal treatment, but not washing. Comparative example 3 is LCO positive electrode scrap having undergone thermal treatment and washing.

Comparative example 4 is NCM fresh active material. Comparative example 5 is NCM positive electrode scrap having undergone thermal treatment, but not washing. Comparative example 6 is NCM positive electrode scrap having undergone thermal treatment and washing.

TABLE 1

| | Type | Thermal treatment with or without LiOH addition | Washing | Li/Metal mole ratio | F content (mg/kg) |
|---|---|---|---|---|---|
| Comparative example 1 | LCO fresh active material | None | None | 0.98 | ND |
| Comparative example 2 | Using LCO positive electrode scrap | Without addition | Unwashed | 0.96 | 1900 |
| Comparative example 3 | Using LCO positive electrode scrap | Without addition | Washed | 0.93 | ND |
| Comparative example 4 | NCM fresh active material | None | None | 0.99 | ND |
| Comparative example 5 | Using NCM positive electrode scrap | Without addition | Unwashed | 0.95 | 1450 |
| Comparative example 6 | Using NCM positive electrode scrap | Without addition | Washed | 0.91 | ND |

ND indicates 30 ppm or less as measured.
Since comparative examples 1 and 4 are fresh active materials, F is hardly detected.

In comparative examples 2 and 5 without washing, the residual F content is measured as 1900 mg/kg and 1450 mg/kg. However, it can be seen that in comparative examples 3 and 6 having undergone washing, LiF is completely dissolved in a washing solution and thus removed so thoroughly that it cannot be detected. Accordingly, both the LCO and NCM positive electrode scrap produces LiF when thermally treated, but LiF is completely removed by washing according to the present disclosure.

Meanwhile, it is found that the Li/metal mole ratio in comparative examples 2 and 5 is reduced by about 0.2-0.5 compared to the fresh active material of comparative examples 1 and 3, and the Li/metal mole ratio in comparative examples 3 and 6 is reduced by about 0.2-0.5 compared to comparative examples 2 and 5. In particular, it seems that the NCM active material has a significant reduction in Li/metal mole ratio due to a larger specific surface area of particles than LCO and transformation to the spinel structure. That is, it can be seen that lithium losses occur in the thermal treatment step for removing the binder and the conductive material, and lithium losses also occur in the surface modification step through washing. Accordingly, the present disclosure proposes performing thermal treatment with an addition of a lithium precursor. When thermal treatment is performed after the addition of the lithium precursor, the added lithium precursor reacts with F and LiF is removed by washing as demonstrated above. In this experimental example 1, comparative examples have lithium losses since they are thermally treated without an addition of a lithium precursor and washed, but when thermal treatment is performed after the addition of the lithium precursor as proposed by the present disclosure, there is no loss of lithium in the positive electrode active material due to the reaction of lithium from the added lithium precursor with F. It can be seen in experimental example 2.

Experimental Example 2

The effect of the thermal treatment after the addition of the lithium precursor is demonstrated.

Sample 1 is fresh NCM active material.

A positive electrode scrap of NCM lithium composite transition metal oxide:carbon black conductive material: PVdF binder=97.5:0.7:1.8 is prepared.

In samples 2 and 3, the positive electrode scrap is dry-milled to obtain an active material in powder form, and the active material is immersed in a lithium precursor LiOH. On the basis of 15 g of the positive electrode, 0.05 mol LiOH is added to 200 ml EtOH, and the active material is dissolved for 30 minutes and dipped for 1 minute. After the dipping, drying is performed at 70° C. for 30 minutes.

In samples 2 and 3, thermal treatment is performed at 550° C. for 30 minutes. The temperature rise rate is 5° C./min, and thermal treatment is performed in air.

In sample 2, washing is not performed, and in sample 3, washing is performed. The washing is performed by stirring at 400 rpm for 10 minutes at thermally treated electrode: lithium compound solution for washing=1:30. Subsequently, vacuum filtering is performed, followed by drying at 100° C. for 24 hours.

In samples 4 and 5, the active material in powder form is not immersed in LiOH, and thermal treatment is performed. In sample 4, washing is not performed, and in sample 5, washing is performed.

To determine the Li/metal mole ratio and the amount of LiF produced in the active material in samples 1 to 5, residual F content analysis is performed, and the results are summarized in Table 2.

TABLE 2

| | Type | Thermal treatment with or with LiOH addition | Washing | Li/Metal mole ratio | F content (mg/kg) |
|---|---|---|---|---|---|
| Sample 1 | Fresh active material | None | None | 1.02 | ND |
| Sample 2 | Using positive electrode scrap | With addition | Unwashed | 1.04 | 2230 |
| Sample 3 | Using positive electrode scrap | With addition | Washed | 0.97 | 70 |

TABLE 2-continued

| | Type | Thermal treatment with or with LiOH addition | Washing | Li/Metal mole ratio | F content (mg/kg) |
|---|---|---|---|---|---|
| Sample 4 | Using positive electrode scrap | Without addition | Unwashed | 1.01 | 1310 |
| Sample 5 | Using positive electrode scrap | Without addition | Washed | 0.94 | 65 |

In the fresh active material of sample 1, F is hardly detected.

The analysis reveals that in the case of sample 4 without lithium precursor (LiOH) addition, after the removal of the binder and the conductive material, F bonded with LiF is produced in an amount of 1310 ppm, while sample 2 with lithium precursor addition, the amount of F bonded with LiF increases to 2230 ppm. That is, since the F compound (gas and F compound) is produced in the equal amount at the same electrode composition, the increased LiF content in sample 2 is identified by the conversion of gaseous F to LiF by 40% or more compared to sample 4. Additionally, when washing is performed in the same washing condition, in samples 3 and 5, LiF is washed, and the F content of sample 3 is reduced to 70 ppm compared to sample 2, and the F content of sample 5 is reduced to 65 ppm compared to sample 4, and thus samples 3 and 5 have reductions at the similar level. Accordingly, when thermal treatment is performed after the addition of the lithium precursor as in samples 2 and 3, the added lithium precursor reacts with F and LiF is removed by washing as shown in sample 3, and it is found that Li remains in the positive electrode active material as much as the amount of Li in the sample 1.

In the case of sample 5, the Li/metal mole ratio is reduced by about 0.07 through washing compared to sample 4, and in the case of sample 3, the Li/metal mole ratio is reduced by the similar ratio to sample 2. That is, the lithium precursor added before the thermal treatment reacts F produced by the decomposition of the binder and suppresses the reactivity with lithium ions in the positive electrode active material. Sample 3 has a higher mole ratio of Li/metal remaining in the positive electrode active material after washing than sample 5.

The above-described experiment identifies that the thermal treatment after the addition of the lithium precursor as proposed by the present disclosure increases LiF production and reduces the production of the F based gas compound (for example, HF), and F reacts with lithium in the added lithium precursor to produce LiF, rather than taking the lithium source by reaction with lithium ions in the active material, thereby suppressing the reduction in the ratio of lithium remaining in the positive electrode active material.

Experimental Example 3

A similar experiment to experimental example 2 is performed on a different type of positive electrode scrap.

Sample 6 is fresh NCM active material.

A positive electrode scrap containing NCM lithium composite transition metal oxide:carbon black conductive material:PVdF binder=96:2:2 is prepared.

In samples 7 and 8, the positive electrode scrap is dry-milled to obtain an active material in powder form, and the active material is immersed in LiOH as a lithium precursor. The immersion conditions and the thermal treatment conditions are the same as experimental example 2. Through the immersion, in samples 7 and 8, 0.05 mol of excess lithium is added compared to sample 6.

Figure 3:
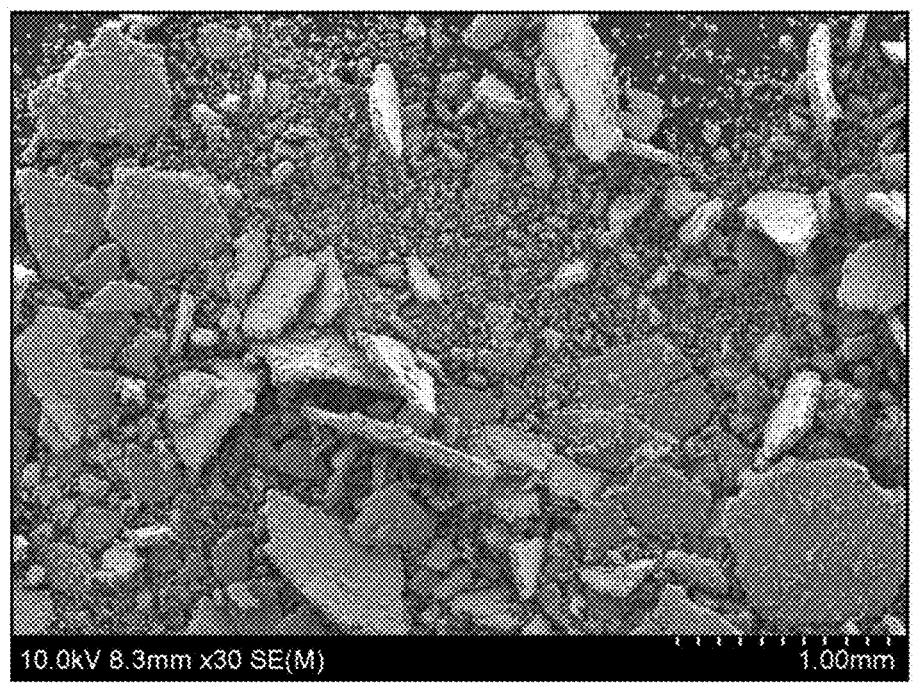
FIG. 3 is a scanning electron microscopy (SEM) image of an active material in grain form after dry-milling.

FIG. 3 is a Scanning Electron Microscope (SEM) image of the active material in grain form after dry-milling. It corresponds to sample 7 before thermal treatment. The SEM imaging is performed using SEM equipment commonly used in the lab. For example, imaging is performed using HITACHI s-4200. There is no difference depending on the measuring device or method. It can be seen that as proposed by the present disclosure, dry-milling brings the active material layer into powdered state and separates it from the current collector.

Figure 4:
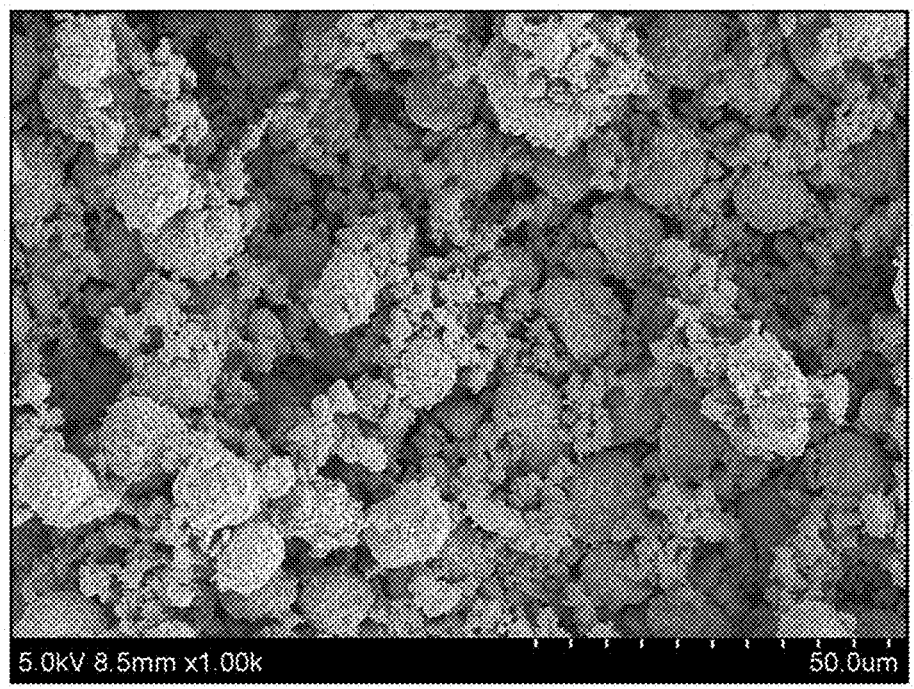
FIG. 4 is an SEM image of an active material in grain form after dry-milling, followed by thermal treatment.

FIG. 4 is a SEM image of the active material in grain form after dry-milling, then thermal treatment after the addition of a lithium precursor. It corresponds to sample 7 after thermal treatment. FIG. 3 shows the agglomerated active material layer in grain form in the presence of the binder in the active material layer before thermal treatment, while FIG. 4 shows deagglomeration as a result of removing the binder by the thermal treatment. Accordingly, it can be seen that the binder or the conductive material is removed by the thermal treatment in air as proposed by the present disclosure and thus the binder or the conductive material hardly remains on the active material surface.

In sample 7, washing is not performed, and in sample 8, washing is performed. For a washing solution, 0.05 mol LiOH aqueous solution is used. The remaining washing conditions are the same as experimental example 2.

In samples 9 and 10, the active material in powder form is not immersed in LiOH and undergoes thermal treatment. In sample 9, washing is not performed, and in sample 10, washing is performed.

In samples 6 to 10, to determine the Li/metal mole ratio and the amount of LiF produced in the active material, residual F content analysis is performed, and the results are summarized in Table 3.

TABLE 3

| | Type | Thermal treatment with or without LiOH addition | Washing | Li/Metal mole ratio | F content (mg/kg) |
|---|---|---|---|---|---|
| Sample 6 | Fresh active material | None | None | 1.03 | ND |
| Sample 7 | Using positive electrode scrap | With addition | Unwashed | 1.02 | 1470 |

TABLE 3-continued

|  | Type | Thermal treatment with or without LiOH addition | Washing | Li/Metal mole ratio | F content (mg/kg) |
|---|---|---|---|---|---|
| Sample 8 | Using positive electrode scrap | With addition | Washed | 0.93 | 70 |
| Sample 9 | Using positive electrode scrap | Without addition | Unwashed | 1.07 | 2575 |
| Sample 10 | Using positive electrode scrap | Without addition | Washed | 0.97 | 87 |

In the fresh active material of sample 6, F is hardly detected, and the Li/metal mole ratio is 1.03.

Sample 9 without lithium precursor (LiOH) addition has the similar Li/metal mole ratio to sample 6, but produces 1470 ppm F. In sample 10 having undergone washing, F is reduced to 70 ppm, but the Li/metal mole ratio is reduced by about 0.1 mole ratio by washing. The LiF removal effect by washing and Li losses by washing are the same as the above-described experimental example 2.

Samples 7 and 8 undergo thermal treatment with the addition of the lithium precursor (LiOH). Sample 7 has a higher Li/metal mole ratio than sample 6 by the addition of the lithium precursor. Additionally, 2575 ppm LiF is produced. However, in sample 8 corresponding to the example of the present disclosure as a result of washing the sample 7, lithium is lost at 0.1 mole ratio by washing compared to sample 8, but the Li/metal mole ratio is higher than that of sample 10 without lithium compound addition.

That is, the active material is overcoated by adding the lithium compound to the active material in powder form, and lithium in the overcoated lithium compound reacts with F in the binder, thereby suppressing the losses of lithium in the active material. Since the thermal treatment is performed after the addition of the lithium compound according to the present disclosure, lithium overcoating is accomplished at the same time with removing the binder and the conductive material, thereby reducing lithium losses in the active material, and annealing is performed at the same time, thereby recovering the crystal structure.

According to the present disclosure, it is possible to collect active materials by the mechanical separation of the active materials from positive electrodes in which faults or defects occurred during the process or positive electrodes separated from lithium secondary batteries discarded after use, prevent lithium losses and recover the crystal structure by the thermal treatment method which is relatively simple, and recover the properties to the fresh active material level through surface modification. In particular, according to the present disclosure, the thermal treatment is performed after the addition of the lithium precursor. Through this, it is possible to reduce HF gas produced by the thermal decomposition of the binder, thereby suppressing lithium losses in the active material.

According to the present disclosure, it is possible to reuse the positive electrode scrap by a simple, eco-friendly and economical method, and manufacture lithium secondary batteries using the prepared NCM lithium composite transition metal oxide positive electrode active material without any problem with battery performance.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and their equivalents.

What is claimed is:

1. A method for reusing a positive electrode active material, comprising:
   (a) dry-milling a positive electrode scrap comprising an active material layer on a current collector to convert the active material layer into a powdered state and to separate the active material layer from the current collector, the active material layer being a lithium composite transition metal oxide positive material active material layer;
   (b) adding a lithium precursor to the active material layer in the powdered state, wherein the lithium precursor is a precursor compound including lithium;
   (c) thermally treating the active material layer in the powdered state in air to collect an active material by overcoating or doping lithium from the lithium precursor on a surface of the active material layer in the powdered state and thermally separating a binder and a conductive material in the active material layer; and
   (d) obtaining a reusable active material by washing the collected active material with a basic lithium compound aqueous solution and drying the collected active material.

2. The method for reusing a positive electrode active material according to claim 1, further comprising surface-coating the reusable active material obtained from the step (d).

3. The method for reusing a positive electrode active material according to claim 1, wherein dry-milling the positive electrode scrap is performed with any one of a pin mill, a disc mill, a cutting mill and a hammer mill.

4. The method for reusing a positive electrode active material according to claim 1, further comprising shredding or cutting the positive electrode scrap before dry-milling the positive electrode scrap.

5. The method for reusing a positive electrode active material according to claim 1, wherein the thermal treatment is performed at 300 to 1000° C.

6. The method for reusing a positive electrode active material according to claim 1, wherein the basic lithium compound aqueous solution comprises another lithium precursor in an amount of more than 0% and 15% or less, and wherein washing the collected active material is performed for 1 hour or less.

7. The method for reusing a positive electrode active material according to claim 1, wherein washing the collected active material is performed by stirring the collected active material immersed in the basic lithium compound aqueous solution.

8. The method for reusing a positive electrode active material according to claim 1, wherein the lithium precursor is at least one of LiOH, $Li_2CO_3$, $LiNO_3$ or $Li_2O$.

9. The method for reusing a positive electrode active material according to claim 1, wherein a temperature for thermally treating the active material layer in the powdered state exceeds a melting point of the lithium precursor.

10. The method for reusing a positive electrode active material according to claim 2, wherein surface-coating the reusable active material obtained from the step (d) includes coating at least one of a metal, an organic metal or a carbon material on the surface of the dried collected active material by a solid or liquid phase process, and thermally treating the surface of the dried collected active material at 100 to 1200° C.

11. The method for reusing a positive electrode active material according to claim 1, wherein the reusable active material is represented by the following Formula 1:

$$Li_aNi_xMn_yCo_zM_wO_{2+\delta},$$ [Formula 1]

wherein M comprises at least one selected from the group consisting of B, W, Al, Ti and Mg, and wherein $1<a\leq1.1$, $0\leq x<0.95$, $0\leq y<0.8$, $0\leq z<1.0$, $0\leq w\leq0.1$, $-0.02\leq\delta\leq0.02$, and $x+y+z+w=1$.

12. The method for reusing a positive electrode active material according to claim 1, wherein the reusable active material has a fluorine (F) content of 100 ppm or less.

* * * * *